Oct. 2, 1951     A. C. DE BEAUREGARD     2,569,658
VARIABLE SPEED CONTROL DEVICE

Original Filed Sept. 28, 1949     2 Sheets-Sheet 1

*INVENTOR.*
AMEDEE COSTA DE BEAUREGARD
BY John H Graham
Agt

Oct. 2, 1951 A. C. DE BEAUREGARD 2,569,658
VARIABLE SPEED CONTROL DEVICE
Original Filed Sept. 28, 1949 2 Sheets-Sheet 2

INVENTOR.
AMEDEE COSTA DE BEAUREGARD
BY John H. Graham
Agt

Patented Oct. 2, 1951

2,569,658

UNITED STATES PATENT OFFICE 2,569,658

VARIABLE-SPEED CONTROL DEVICE

Amédée Costa de Beauregard, Paris, France, assignor to Specialties, Inc., Syosset, N. Y., a corporation of New York Original application September 28, 1949, Serial No. 118,421. Divided and this application August 23, 1950, Serial No. 180,923

11 Claims. (Cl. 74—721)

This invention relates to variable speed control devices. In some apparatus it is extremely desirable to have precise control of an output function with accurate infinitely variable speed change control whereby the rotatory output can be varied by minute amounts while maintaining the speed thereof at a controlled value.

For example, in my co-pending application Serial No. 118,421 filed September 28, 1949, for Winding Machines of which this application is a divisional, there is described, illustrated and claimed a precise coil winding machine where such infinitely changeable speed control is of great use. Other similar machines can utilize the precise speed control of the present invention and the applicability hereof to any rotationary apparatus to control a speed function is obvious.

Accordingly, it is the object of the present invention to provide an accurate infinitely variable change speed escapement device for varying by minute amounts the speed of rotatory apparatus of any nature and maintaining the selected speed at a controlled value determined by the escapement.

It is a further object of the invention to provide means for a machine having requirements of precise control of rotation in any of its parts, to control the rotational characteristics of the power output shaft driving the machine or part thereof through a variable speed control escapement assembly without transmitting the torque load from the input through the variable speed assembly, whereby a very precise and accurately controlled speed ratio will be supplied to the machine or part thereof.

It is another object of the invention to provide a speed control device as a unit which can be attached to any machine to provide accurate speed control and minute increments of speed changes to any rotatory part of the machine.

Generally, in practicing the present invention, there is provided a dome or equivalent spherical surface which is rotated by a constant speed means, a frictionally contacting rider being associated with the spherical surface.

A worm gear on the main drive shaft, or output side leading to the machine meshes with a worm mounted to move with the rider. The teeth of the worm and worm gear are so chosen as to be substantially non-reversible, whereby the worm gear cannot drive the worm. With a torque load applied on the main shaft, only such power will be allowed to escape to drive the machine as is permitted by the rotation of the rider, so that the speed of rotation of the dome governs the speed of rotation of the machine, and the speed ratio can be varied by infinite amounts by altering the relative position of dome and rider.

If the rotation imparted to the dome be considered as an input, and the rotation of the shaft carrying the worm gear be considered as the output, there is then provided an infinitely variable speed control assembly wherein a precise control at all speeds between the maximum and the minimum is obtained without slippage, without transmitting any of the torque load through the dome and rider.

In practice, the gear teeth of the worm and worm gear are fashioned to be at their limit of reversibility, in order that there will not be too great a binding contact between the contacting faces of the teeth.

This is particularly desirable when the torque load delivered by the prime mover to the machine through the speed-control escapement mechanism just described is several times greater than the torque needed to operate the machine.

Reference will now be made to the accompanying drawings which illustrate one embodiment of the present invention.

Figure 1:
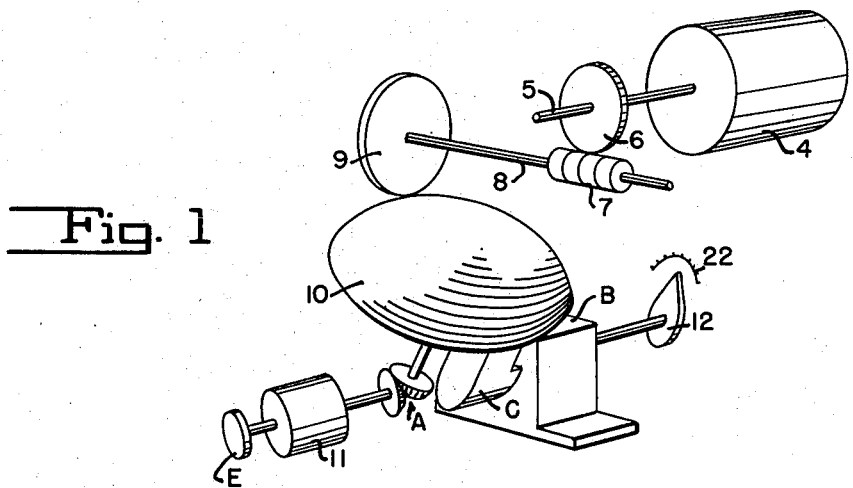
Figure 1 is an isometric view of one form of variable speed change device, according to the present invention.

Referring now specifically to Fig. 1 of the drawings, a diagrammatical and graphic illustration of the speed control device according to the present invention is thereby represented.

The power output of a motor 4 is applied to a shaft 5 on which is mounted a worm gear 6 meshing with a worm 7, the gears being selected as non-reversible so that worm gear 6 cannot drive worm 7. While the power or torque applied to shaft 5 has been given as by a motor 4, any power can be utilized and the only requirement is that shaft 5 be torque loaded. With the worm 7 at rest, whatever torque is applied to shaft 5 will have no effect on its rotational characteristics. If now worm 7 is rotated however slowly, an amount of power will be permitted to escape into shaft 5 as an output, the amount being governed entirely by the speed of rotation of worm 7. Worm 7 is rotated by shaft 8 through the medium of friction disc or rider 9 which picks up its rotational characteristics from a rotating spherical surface, such as the dome 10. Dome 10 is rotated at a speed determined by the input which may be the motor 11 which has a constant speed governor device E of any suitable type, but any rotational input, or any input which can be converted to rotation of dome 10, can be used. The variability of the drive of dome 10 and rider 9 is provided for by a mounting block B in which the supporting bracket C for the dome is journalled, and a handle 12 capable of swinging bracket C through an arcuate path, this being permitted by bevel gears A. The relative driving position of dome 10 and rider 9 will determine the speed of worm 7 and precisely control the speed of shaft 5, namely the rotational output. The system operates substantially without slip since the frictionally contact of rider 9 on dome 10 is light and there is theoretically no power transmitted from the worm gear 6 to the worm 7.

While the speed change device of dome and rider gives the best results where infinitely variable speed changes are required, any other form of variable speed device can be substituted without altering the precise control values of the system. It should be noted that the spherical variable speed precise control escapement assembly just described owes its precision in part to the fact that the torque load is not transmitted through the drive itself.

Figure 2:
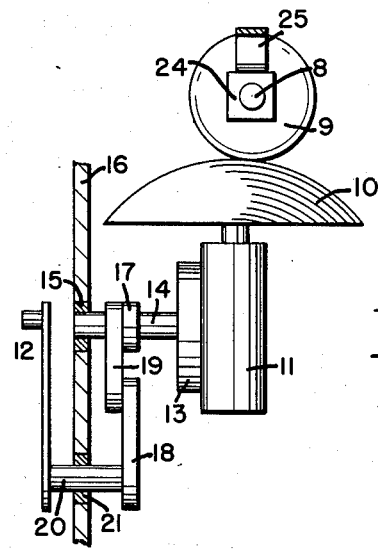
Figure 2 is a front elevation of part of the apparatus of Fig. 1 showing the mode of operation.
Figure 3:
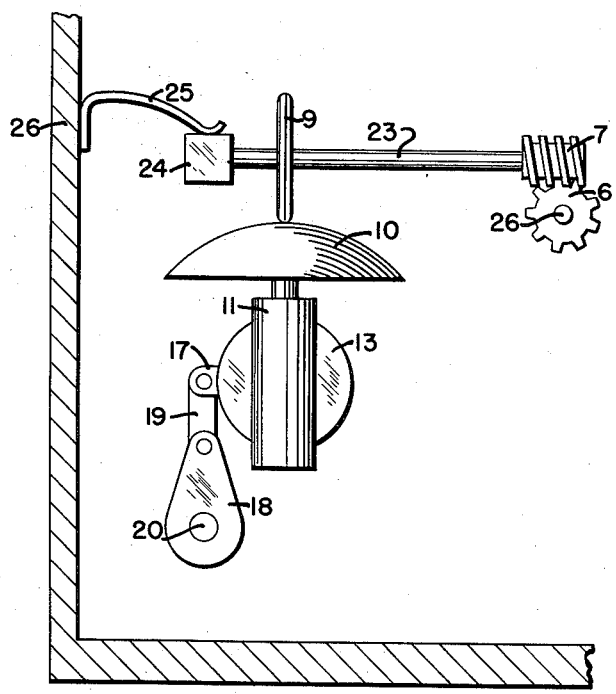
Figure 3 is a side view of the apparatus of Fig. 2, looking from the right of Fig. 2.

Referring to Figs. 2 and 3, one construction to operate the device of Fig. 1 is shown.

The dome 10 is adapted to bo rotated by motor 11 as by bevel gears equivalent to A (not shown). Motor 11 is chosen for constant speed characteristics, with or without other conventional means for maintaining the speed of rotation as constant as possible and is carried by a mounting block 13 which is fixed on a shaft 14 mounted to rotate in a bearing 15 in a wall 16 of the machine to which the device is attached. Mounted on shaft 14 to move same is a lever 17 linked to a lever 18 by an intermediate link 19, lever 18 being mounted on a shaft 20 to move therewith under urge of lever 12 (see Fig. 1) which connects with shaft 20 externally of the machine. Shaft 20 is journalled in wall 16 by a bearing 21. Thus, by moving lever 12 the position of dome 10 relative to rider 9, which is in frictional contact therewith, can be changed externally of the machine, the change made being observable on a suitable scale 22 by using lever 12 as a pointer (Fig. 1). Rider 9 is mounted on a shaft 23 which carries at one end the worm 7 of Fig. 1. At the other end of shaft 23 is a block 24 adapted to be spring urged downwardly by a leaf spring 25 suitably attached to another wall 26 of the machine, to give the desired resilient pressure of rider 9 on dome 10.

Worm 7 meshes with worm gear 6, worm gear 6 being mounted for rotation therewith on shaft 26, which is the main shaft of the machine and is driven from the prime mover 4, as previously described in any suitable manner. For correct operation of the speed control-escapement assembly comprising dome 10, rider 9, shaft 23 and gears 7 and 6 it is necessary that the worm gear 6 and worm 7 have their gear teeth cut so that the gears are not reversible, and preferably the teeth as so selected that the gears when in mesh are at their limit of reversibility. Since therefore worm gear 6 cannot drive worm 7, however much torque is applied by prime mover 4 to shaft 26, only that amount will be allowed to escape into the machine which is permitted by rotation of the worm 7.

Scale 22 may be in some instances be directly graduated in minutes of time since any change of relative position of dome 10 and rider 9 will change the speed of shaft 5. As previously mentioned, however, much torque is applied by the prime mover 4, the speed of shaft 5 or main shaft 26 will only be that permitted by the assembly comprising dome 10, rider 9, worm 7 and worm gear 6 and this will also apply with respect to variations in line voltage which would normally alter the speed of prime mover 4 and any other conditions which would tend to disturb the speed of the prime mover will be equally compensated for.

This forms a true escapement mechanism in that the prime mover 4 is applying power to main shaft 5 and gear 6 and if gear 6 were free of worm 7, or able to rotate worm 7, then shaft 5 would attain a maximum rotational speed depending on the speed of rotation of motor 4 and this would vary as the speed of motor 4 varied, under external conditions. Worm 7, however, being the driving element permits power from motor 4 to escape and be usefully employed only to the extent that it is itself rotated by rider 9 from dome 10. Also, by varying the speed of rotation of the worm by arcuate movements of dome 10 more or less power can be allowed to escape, namely, the speed of rotation of the machine or any part thereof can be varied as desired.

In practice, the prime mover 4 provides an amount of torque far in excess of the ultimate possible requirements of the machine, whereby there is always ample torque available for the machine depending on the amount allowed to be delivered by the speed control-escapement assembly.

It should also be realized that with this arrangement theoretically there is no power at all supplied to gear 6 and thus shaft 5, by worm 7.

Consequently, with the meshing worm 7 and gear 6 unloaded, according to all practical considerations, the danger of slippage of rider 9 on dome 10 is eliminated, again assisting the desired achievement of a precise control of speed.

The manner in which the unit comprising the assembly shown in Fig. 1 is assembled with any apparatus where precise speed control with variability in infinitely small increments is obvious and within the skill of any artisan. As a unit the assembly of Fig. 1 without the prime mover 4 and shaft 5 may be formed ready to be assembled in an existing machine with gear 6 then mounted to be drivingly associated with the main shaft of the machine. Alternatively, the assembly of Fig. 1 may be formed as a unit in toto to be then associated drivingly with the main shaft of the machine by appropriate gearing from shaft 5 thereto.

While the shape of dome 10 has been shown as described as semi-spherical, it is obviously that for some purposes this contour could be changed.

As an example of the use of the device of the present invention reference is made to said co-pending application Serial No. 118,421 wherein parts of the device forming the present invention are incorporated.

It will thus be seen that the present invention provides escapement variable speed drive control mechanism for precise government of the speed of apparatus without transmitting the torque load through the mechanism which will achieve the objects set forth.

I claim:

1. A variable speed control-escapement assembly for a machine comprising a source of rotational power supplying torque in excess of that required for the machine; a meshing worm gear and worm having their teeth formed so that they are at the threshold of reversibility; connections between said worm gear and said source of rotation power; a spherical member mounted for rotation and pivotally movable; means for pivotally moving said spherical member in an arcuate path; means for rotating said spherical member; a rider in frictional contact with the rotating surface of said spherical member and tangentially mounted relative to a circumference of said spherical member; driving connections between said worm and rider; and an output connection from said worm gear and machine; whereby the speed of rotation of said spherical member and the relative position of said spherical member and rider govern the output torque permitted to escape through said worm and worm gear.

2. A variable speed control-escapement device for operating apparatus comprising in combination a rotational input; a spherical member adapted to be rotated by said input in magnitude dictated by said input; a source of rotational output, or torque greater than the load required by the apparatus to be operated by the output; a worm gear drivingly connected with said output; a worm meshing with said worm gear; a friction rider tangentially engaging the surface of said spherical member; driving connections between said rider and worm; and means for moving the relative positions of said spherical member and rider in an arcuate path while maintaining the tangential contact of the rider on the surface; whereby said output is controlled by the input in magnitude while changes of output in magnitude and sense can be made by adjusting the relative position of rider and spherical member.

3. A variable speed control-escapement device for operating apparatus comprising in combination a rotational input; a spherical member adapted to be rotated by said input in magnitude dictated by said input; a source of rotation output of torque greater than the load required by the apparatus to be operated by the output; a worm gear drivingly connected with said output; a worm meshing with said worm gear; a friction rider tangentially engaging the surface of said spherical member; driving connections between said rider and worm; and means for moving the relative positions of said spherical member and rider in an arcuate path while maintaining the tangential contact of the rider on the surface; whereby said output is controlled by the input in magnitude while changes of output in magnitude and sense can be made by adjusting the relative position of rider and spherical member; the teeth of the worm and worm gear being so formed that they are at their limit of reversibility, whereby the worm gear cannot drive the worm however much torque is applied as an output.

4. A variable speed drive-control mechanism for precise government of the speed of rotation of apparatus without transmitting the torque load through the mechanism comprising a rotational input; a variable speed drive having an input and output element; connections from said rotational input to said input element; a source of rotational output to be governed of greater torque load than that required by the apparatus being controlled; a worm gear drivingly connected with said rotational output; a worm meshing with said worm gear; driving connections between said worm and said output element; and means for varying the speed ratio between said input element and output element; said worm and worm gear being non-reversible, whereby rotation of said rotational output will be governed by rotation of said worm, which in turn is governed by the rotational input.

5. A variable speed control device comprising a meshing worm gear and worm having their teeth so formed that they are on the threshold of reversibility, said worm gear being adapted to be drivingly connected to the prime mover of a machine to be speed controlled; a member mounted for rotation having a shaped surface; means for swinging said surface through an arcuate path; means for rotating said member at a constant speed; a frictional contact member riding on said surface and driven thereby; resilient means urging said rider into frictional contact with said surface; and driving connections between said worm and said frictional contact member; whereby the relative position of said rotating member and said frictional contact governs the output torque of said prime mover permitted to escape through said worm and gear.

6. A variable speed control device comprising a meshing worm gear and worm, said worm gear being adapted to be drivingly connected to the prime mover of a machine to be speed controlled; a member mounted for rotation having a shaped surface; means for swinging said surface through an arcuate path; means for rotating said member; a frictional contact member riding on said surface and driven thereby; and driving connections between said worm and said frictional contact member; whereby the relative position of said rotating member and said frictional contact governs the output torque of said prime mover permitted to escape through said worm and gear.

7. A variable speed control-escapement device as claimed in claim 2 wherein said friction rider is resiliently urged into contact with said spherical member.

8. A variable speed drive-control unit for precise government of the speed of rotation of apparatus without transmitting the torque load through the unit comprising; a rotational input; a variable speed drive having a rotatable member and a frictional contact member driven thereby; connections between said rotational input and said rotatable member; a worm mounted to move with said frictional contact member; a worm gear meshing with said worm and adapted to be connected drivingly with the prime mover of the apparatus to be controlled; and means for varying the speed ratio between the rotatable member and its frictional contact member.

9. A variable speed drive-control assembly for precise government of the speed of rotation of apparatus comprising an electric motor; a constant speed control device for said motor; a spherical member mounted in a bracket and connected by bevel gears to said motor to be rotated thereby; a second electric motor of characteristics such as to supply a torque greater than that required by the apparatus to be controlled; a worm gear mounted to be driven by said second motor; a worm meshing with said worm gear, the teeth of the worm and gear being so formed that they are on the threshold of reversibility; a friction rider resiliently urged into contact with said spherical member engaging the surface of said spherical member tangentially; a shaft common to said worm and rider; and operating means to swing said bracket in an arcuate path while maintaining contact of said rider on said spherical surface, to alter the speed ratio by infinitely small increments.

10. A variable speed drive-control assembly for precise government of the speed of rotation of apparatus comprising an electric motor; a spherical member mounted in a bracket and connected to said motor to be rotated thereby; a second electric motor of characteristics such as to supply a torque greater than that required by the apparatus to be controlled; a worm gear mounted to be driven by said second motor; a worm meshing with said worm gear; a friction rider engaging the surface of said spherical member tangentially; a shaft common to said worm and rider; and operating means to swing said bracket in an arcuate path while maintaining contact of said rider on said spherical surface, to alter the speed ratio by infinitely small increments.

11. A variable speed drive-control assembly as claimed in claim 9 wherein said operating means include a manually swingable lever attached to a shaft mounted in a bearing in said bracket and a pointer carried by said lever over a scale, to indicate the degree of change of speed being made.

AMÉDÉE COSTA DE BEAUREGARD.

REFERENCES CITED

The following references are of record in the file of this patent:

FOREIGN PATENTS

| Number | Country | Date |
|---|---|---|
| 45,911 | Switzerland | Dec. 24, 1928 |